(12) United States Patent
Roberts

(10) Patent No.: US 7,585,179 B2
(45) Date of Patent: Sep. 8, 2009

(54) CABLE CONNECTION

(75) Inventor: Paul Charles Roberts, Bristol (GB)

(73) Assignee: Vetco Gray Controls Limited, Nailsea, Bristol (GB)

( * ) Notice: Subject to any disclaimer, the term of this patent is extended or adjusted under 35 U.S.C. 154(b) by 609 days.

(21) Appl. No.: 11/173,467

(22) Filed: Jul. 1, 2005

(65) Prior Publication Data

US 2006/0003626 A1 Jan. 5, 2006

(30) Foreign Application Priority Data

Jul. 1, 2004 (GB) .................... 0414713

(51) Int. Cl.
*H01R 13/58* (2006.01)
(52) U.S. Cl. .................... 439/451; 439/455; 439/476.1; 439/477
(58) Field of Classification Search ......... 439/450–451, 439/455, 476.1, 477
See application file for complete search history.

(56) References Cited

U.S. PATENT DOCUMENTS

| | | | |
|---|---|---|---|
| 2,986,719 A | 5/1961 | Adams | |
| 3,008,115 A | 11/1961 | Oakes | |
| 4,072,388 A | 2/1978 | Dunn | |
| 5,211,572 A | * 5/1993 | Comstock et al. | ........... 439/352 |
| 5,443,328 A | 8/1995 | Alcock et al. | |
| 6,452,095 B1 | 9/2002 | Perrault | |

FOREIGN PATENT DOCUMENTS

| | | |
|---|---|---|
| DE | 10029096 A1 | 12/2001 |
| EP | 0034111 A1 | 8/1981 |
| GB | 577487 | 5/1946 |
| GB | 2360642 A | 9/2001 |
| GB | 2361363 A | 10/2001 |

* cited by examiner

*Primary Examiner*—Truc T Nguyen
(74) *Attorney, Agent, or Firm*—Bracewell & Giuliani LLP

(57) ABSTRACT

A cable connection for connecting a cable 9 to an underwater installation 7 comprises a connector (2, see FIG. 2) for connection to an end of the cable 9, the connector having at a first end engagement means for engaging with the installation 7, a tether (4, see FIG. 2) which in use has a first end attached to the connector and a second end attached to the cable at a distance from said end of the cable and guide means (12, 13, 14) located proximate a section of the cable adjacent said end of the cable so that in use said section is substantially restrained by said guide means at a predetermined angle with respect to the engagement means.

26 Claims, 4 Drawing Sheets

CABLE CONNECTION

RELATED APPLICATION

This application claims the benefit of United Kingdom Patent Application No. 0414713.8, filed on Jul. 1, 2004, which hereby is incorporated by reference in its entirety.

FIELD OF THE INVENTION

This invention concerns a cable connection for connecting a cable to an underwater installation.

BACKGROUND OF THE INVENTION

The subsea fluid extraction business employs microseismic technology to reveal the geological structure under the seabed to facilitate efficient extraction of the fluid. Typically, an array of microseismic sensors is laid on the seabed, which are connected to a subsea installation known as a hub also located on the seabed. The sensors are typically incorporated within a cable as a serial run of sensors down the length of the cable, with several cables making up a matrix of sensors covering a wide area. Typically, each cable may incorporate 120 sensors and a multiplicity of cables covers an area of ten by ten kilometers, i.e. one hundred square kilometers. The hub at the centre of the matrix houses a number of subsea electronics modules which collect the data from the sensor array and transmit it to a surface platform or shore-based monitoring installation via an umbilical line. The same umbilical feeds electric power to the hub. The umbilical and sensor cables are typically terminated at the hub with connectors, which are mated to the hub connections using a Remote Operated Vehicle (ROV). Thus the connectors are designed to be ROV-friendly.

FIG. 1 shows a typical connector designed for this purpose, well-proven in the subsea fluid extraction business. Since the mating action is a push-fit, the connector includes a handle 1, in line with the connector body 2, to facilitate the mating of the connector, via engagement means, to a hub 7 using an ROV. As a consequence, the cable 3 terminates at the connector at an angle, typically 45 degrees, to the connector body 2 and not in line with it, due to the need to have the handle in line with the connector body for ROV operation.

There is a major problem with this type of ROV-mated connector however, which occurs if the cable or umbilical is accidentally snagged, for example by the anchor of a moving vessel, resulting in the connector being pulled. If the cable 3 was in line with the connector body 2, the result might be that the connector would be disengaged or unmated from the hub 7 which would create operational difficulties but would not result in any damage. However, the cable 3 is not terminated at the connector 2 in line with its body and the direction of pull is unlikely to be in line with the connector body either, which means that the connector will be subjected to a shearing force. The consequence is that the connector may be ripped from the subsea hub almost certainly damaging the connector and the hub connection, and may even damage the hub itself. Clearly the risk of a cable being snagged over an area of typically one hundred square kilometers is large, as it is not practical to make such a large area a ship exclusion zone.

SUMMARY OF THE INVENTION

It is an object of the present invention to provide a cable connection that prevents damage to equipment in the event that a cable is snagged.

In accordance with a first aspect of the present invention, there is provided a cable connection for connecting a cable to an underwater installation, comprising a connector for connection to an end of the cable, the connector having a first end for engagement with the installation and a tether which in use has a first end attached to the connector and a second end attached to the cable at a distance from said end of the cable.

In accordance with a second aspect of the invention, there is provided a cable connection for connecting a cable to an underwater installation, comprising a connector for connection to an end of the cable, the connector having at a first end engagement means for engaging with the installation, a tether which in use has a first end attached to the connector and a second end attached to the cable at a distance from said end of the cable and guide means located proximate a section of the cable adjacent said end of the cable so that in use said section is substantially restrained by said guide means at a predetermined angle with respect to the engagement means.

In accordance with a third aspect of the present invention, there is provided a cable connection for connecting a cable to an underwater installation, comprising a connector for connection to an end of the cable, the connector having at a first end engagement means for engaging with the installation, and guide means located proximate a section of the cable adjacent said end of the cable so that in use said section is substantially restrained by said guide means at a predetermined angle with respect to the engagement means.

Advantageously, the connector includes a handle at a second end of the connector, and the handle is adapted to be manipulable by a remote operated vehicle.

Preferably in use the cable is connected to the connector in a region between first and second ends of the connector.

The tether may comprise a wire.

The first end of the tether may be attached to the handle.

Preferably, the guide means includes at least one pulley arranged at the distal end of the section. The guide means may include at least one guide pin and/or a restraining bar.

Advantageously, the guide means is mounted on a base, which may be adapted to support the installation and assist moving of the installation into an operational position prior to use.

In accordance with a fourth aspect of the present invention there is provided an underwater complex comprising the connection.

BRIEF DESCRIPTION OF THE DRAWINGS

The invention will now be described by way of example with reference to the following figures, in which.

DETAILED DESCRIPTION OF THE PREFERRED EMBODIMENT

Figure 1:
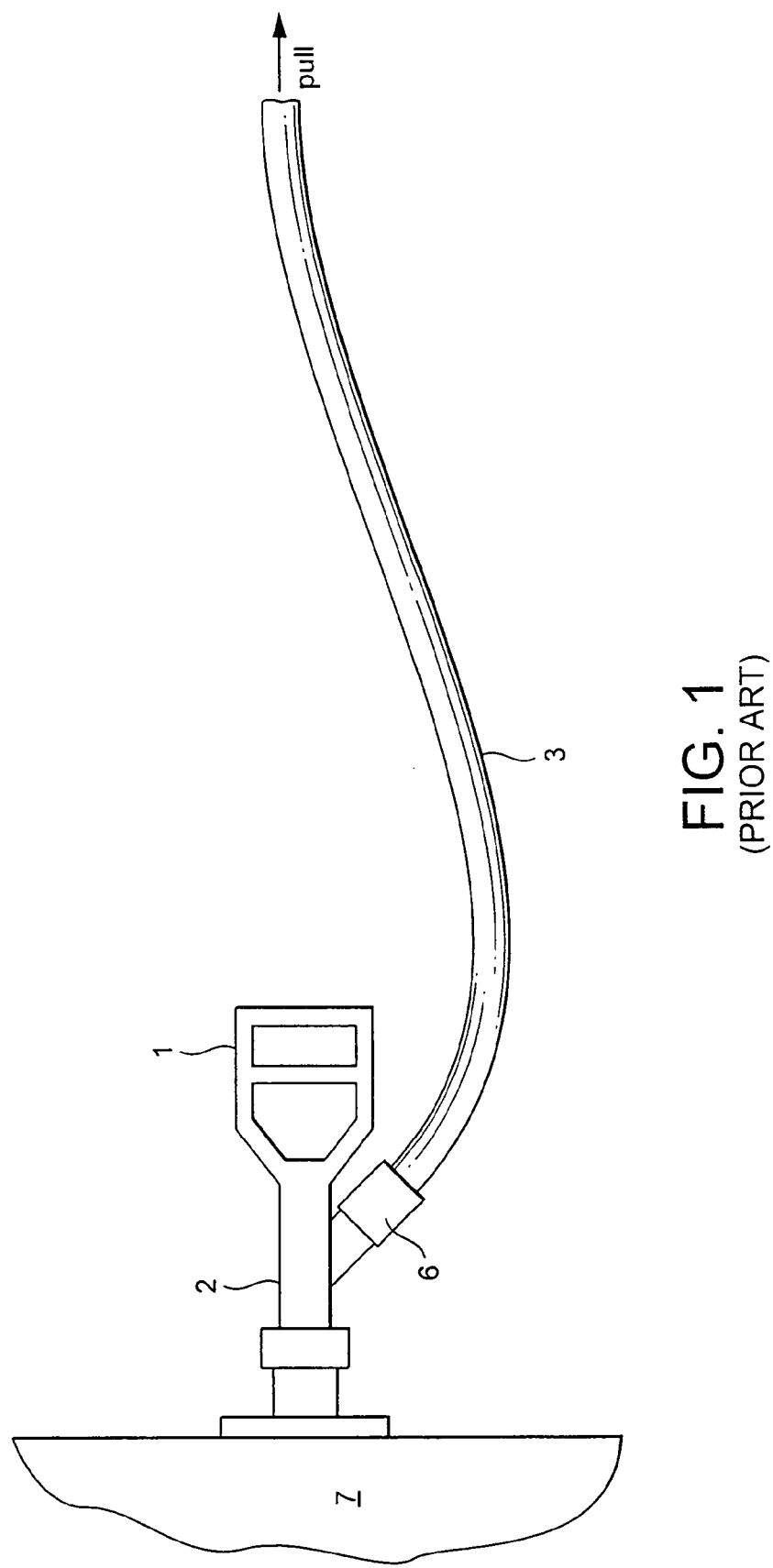
FIG. 1 shows a known cable connection.
Figure 2:
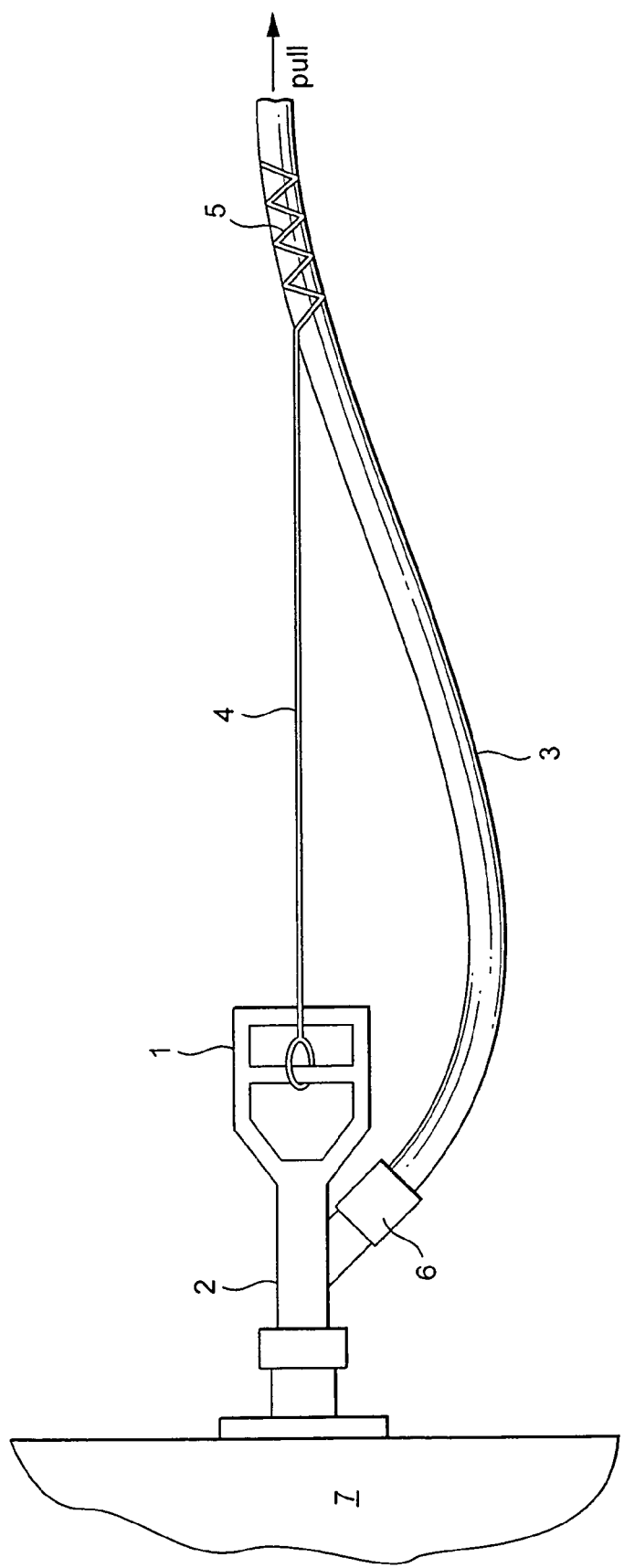
FIG. 2 shows a cable connection in accordance with a first embodiment of the invention.

FIG. 2 illustrates a cable connection in accordance with a first embodiment of the invention. The drawing shows a cable connection similar to the prior art device shown in FIG. 1, but with the addition of a tether 4 with one end attached to the cable 3 at point 5 at a distance from the connection end of the cable, and the other end attached to the connector handle 1.

The tether may be formed as a wire link for example. It can be seen with this inventive arrangement that if the cable were to be pulled as indicated, then the tether 4 transfers the pulling force to the handle 1 rather than to the cable termination point 6. As the handle 1 is in-line with the connector body 2, a pulling force cannot now not damage the termination 6, but instead will act to remove the connector 2 from the hub 7.

Figure 3A:
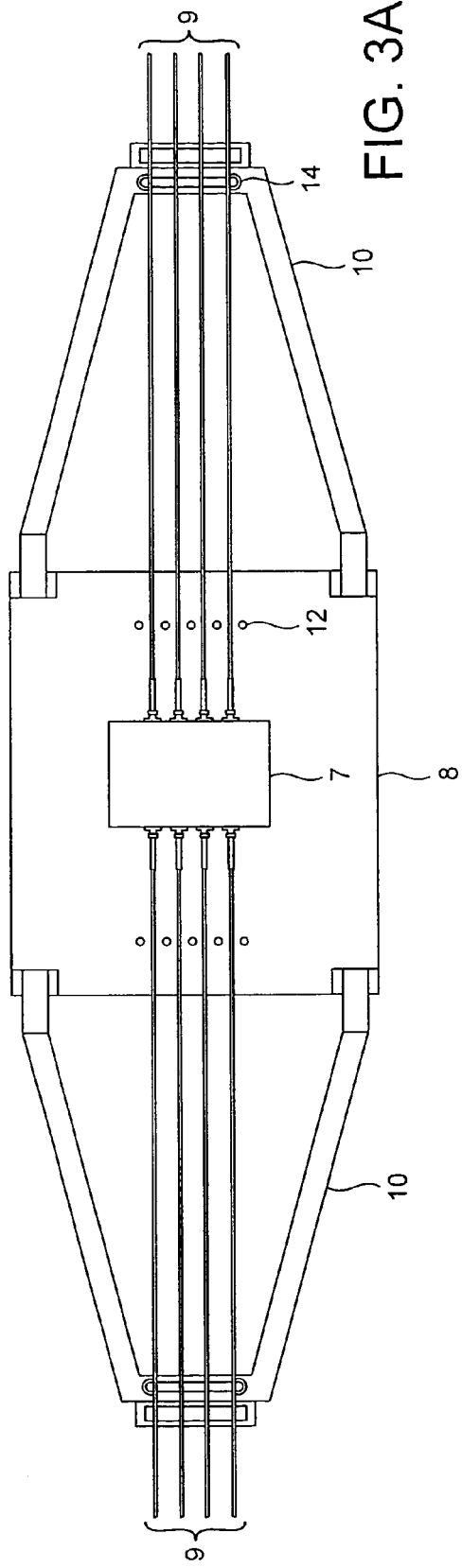
FIG. 3 shows in plan (A), side elevation (B) and enlarged side (C) views a cable connection according to the invention.
Figure 3B:
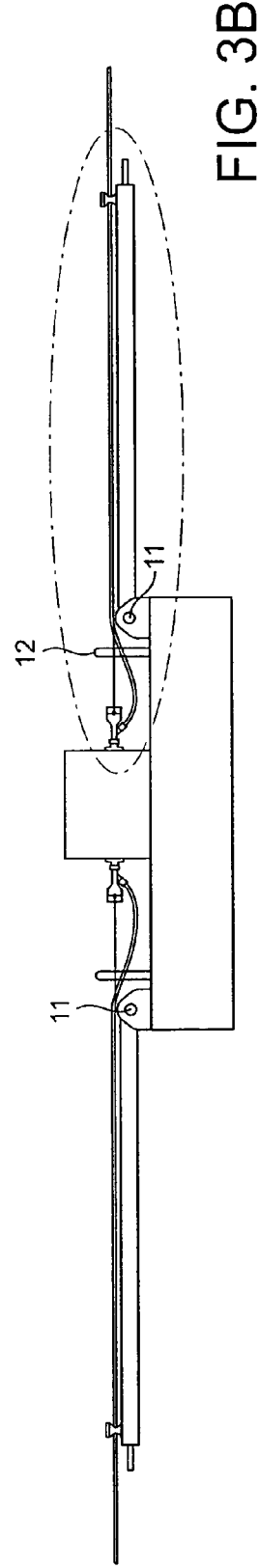
Figure 3C:
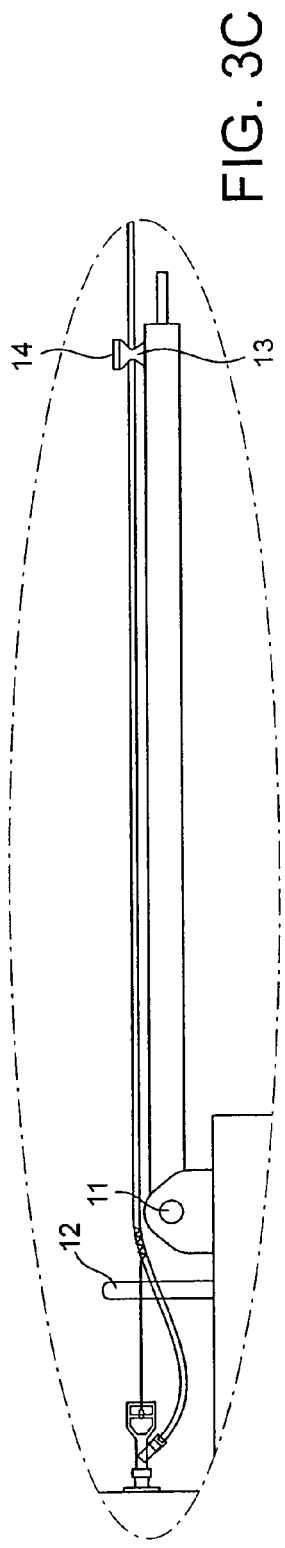

A second feature of the invention is shown in FIG. 3. A subsea hub 7 is mounted in a base assembly 8 located on the seabed, in the centre of a matrix of cables incorporating sensors which terminate at the hub 7. For simplicity, eight cables 9 are shown, any of which can be an umbilical from the surface platform. Each cable 9 is fitted with the ROV-friendly connector, which is shown tethered as in FIG. 2. The base assembly 8 is fitted with two arms 10, which are attached to it by pivots 11. Each of the cables 9 passes through guide means, shown here comprising separate guide pins 12, a pair of guide pulleys 13 and a restraining bar 14, so that a section of cable is restrained at a predetermined angle with respect to the connector's engagement means for mating to the hub. Here the predetermined angle is 90 degrees, in other words the cable section is restrained to be orthogonal to the connection, and in-line with the connector body 2. In FIG. 3, only two pulleys 13 are shown in proximity to each restraining bar 14, however further pulleys may be provided so that each cable 9 is "sandwiched" between two pulleys.

With this guide means arrangement, any cable attached to the hub is protected from damage by snagging. Such an event will pull the cable in the direction of the connector body due to the constraint of the guide pulleys 13 and guide pins 12 in the horizontal plane, and by the restraining bar 14 in the vertical plane. The pulling force in the cable is transferred to the handle of the connector 1 via the tether 4. Thus an unmating force is correctly applied to the connector handle then safely disconnects the connector from the hub without damage to either. Obviously, the guide means cannot restrain the cable too tightly, but must leave a sufficient gap for the disengaged connector to pass through without being damaged.

Figure 4:
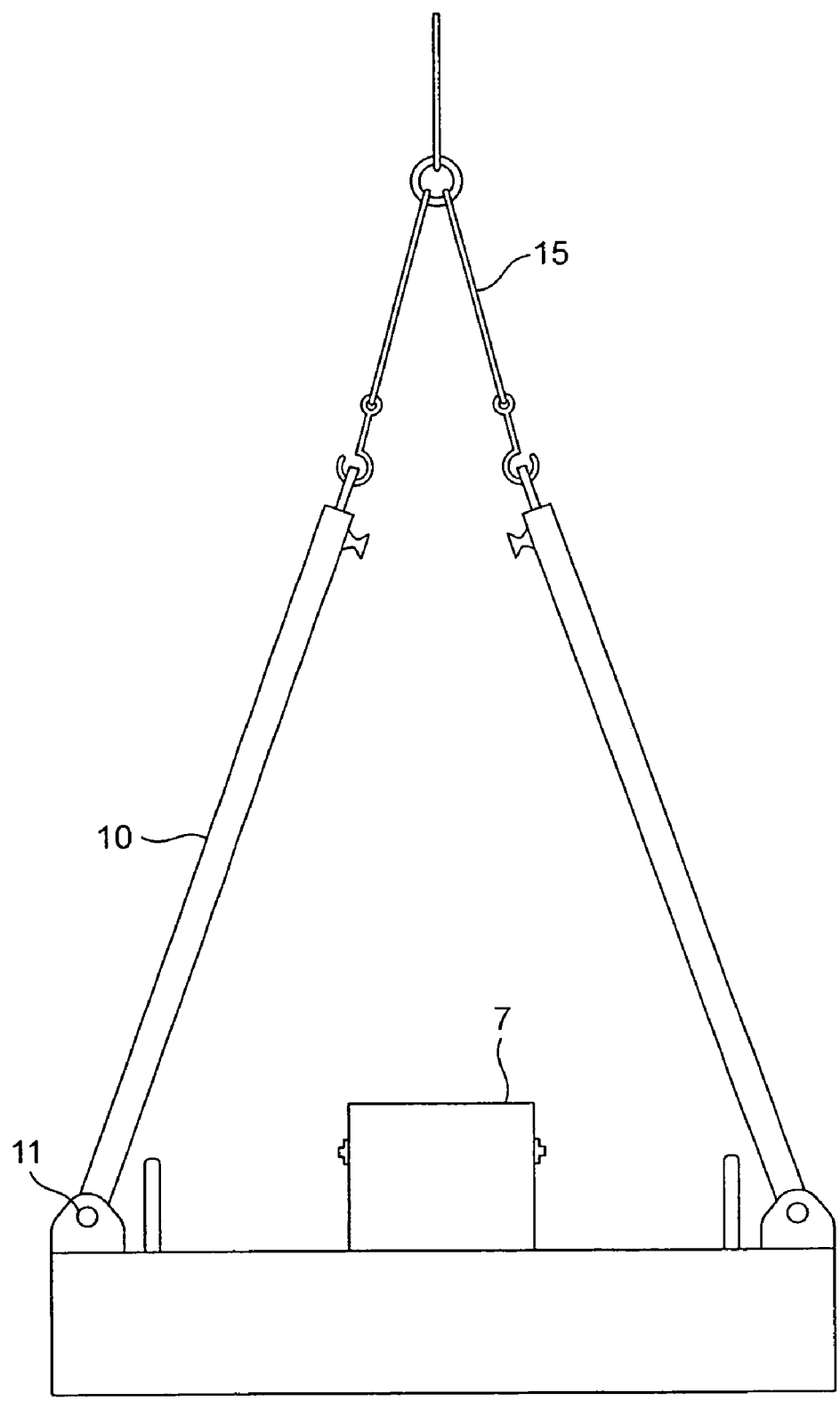
FIG. 4 shows a hub deployment method using the apparatus of the present invention.

Conventionally, the base assembly 8 is used to deploy the hub on the seabed, and it is advantageous that this feature is retained using the inventive apparatus. FIG. 4 shows the assembly being used to deploy the hub. The subsea hub 7 is located in the cable guide mechanism with the arms 10 raised, by virtue of pivots 11, and attached to a lifting assembly, typically a two-hook, ring and cable assembly 15, by which the assembly is winched to the seabed. When located on the seabed, the lifting assembly is detached and the arms 10 lowered by an ROV, which also attaches the cables 9, terminated by connectors as shown in FIG. 2 to the hub 7, as illustrated in FIG. 3.

Although the invention has been described with reference to the embodiments above, there are many other modifications and alternatives possible within the scope of the claims.

The invention claimed is:

1. A cable connection comprising:
    a connector for connection to an end of a cable, the connector having a longitudinal axis and a first end for engagement with an installation; and
    a tether which in use has a first end attached to the connector and a second end attached to the cable at a distance from said end of the cable, wherein the cable enters the connector at an angle to the longitudinal axis, and wherein a disengaging force can be applied to the connector along the longitudinal axis via the tether such that the connector disengages from the installation.
2. The connection according to claim 1, wherein the connector comprises a handle at a second end of the connector.
3. The connection according to claim 2, wherein the handle is adapted to be manipulable by a remote operated vehicle.
4. The connection according to claim 1, wherein the cable is connected to the connector in a region between first and second ends of the connector.
5. The connection according to claim 1, wherein the tether comprises a wire.
6. The connection according to claim 1, wherein the first end of the tether is attached to the handle.
7. A cable connection comprising:
    a connector for connection to an end of a cable, the connector having a longitudinal axis and a first end for engagement with an underwater installation;
    a tether which in use has a first end attached to the connector and a second end attached to the cable at a distance from said end of the cable, wherein the cable enters the connector at an angle to the longitudinal axis, and wherein a disengaging force can be applied to the connector along the longitudinal axis via the tether such that the connector disengages from the underwater installation; and
    a guide device located proximate a section of the cable adjacent said end of the cable so that in use said section is substantially restrained by said guide device at a predetermined angle with respect to the longitudinal axis.
8. The connection according to claim 7, wherein the connector comprises a handle at a second end of the connector.
9. The connection according to claim 8, wherein the handle is adapted to be manipulable by a remote operated vehicle.
10. The connection according to claim 7, wherein the cable is connected to the connector in a region between first and second ends of the connector.
11. The connection according to claim 7 wherein the tether comprises a wire.
12. The connection according to claim 7 wherein the first end of the tether is attached to the handle.
13. The connection according to claim 7, wherein the guide device comprises at least one pulley arranged at the distal end of the section.
14. The connection according to claim 7, wherein the guide device comprises at least one guide pin.
15. The connection according to claim 7, wherein the guide device comprises a restraining bar.
16. The connection according to claim 7, wherein the guide device is mounted on a base.
17. The connection according to claim 16, wherein the base is adapted to support the underwater installation.
18. The connection according to claim 16, wherein the base is adapted to assist moving of the underwater installation into an operational position prior to use.
19. A cable connection comprising:
    a connector for connection to an end of a cable, the connector having a longitudinal axis and a first end for engagement with an underwater installation, and a second end, wherein the second end comprises a handle that is capable of manipulation by a remote operated vehicle; and
    a guide device located proximate a section of the cable adjacent said end of the cable so that in use said section is substantially restrained by the guide device at a predetermined angle with respect to the longitudinal axis.
20. The connection according to claim 19, wherein the cable is connected to the connector in a region between first and second ends of the connector.
21. The connection according to claim 19, wherein the guide device comprises at least one pulley arranged at the distal end of the section.

22. The connection according to claim 19, wherein the guide device comprises at least one guide pin.

23. The connection according to claim 19, wherein the guide device comprises a restraining bar.

24. The connection according to claim 19, wherein the guide device is mounted on a base.

25. The connection according to claim 24, wherein the base is adapted to support the underwater installation.

26. The connection according to claim 24, wherein the base is adapted to assist moving of the underwater installation into an operational position prior to use.

\* \* \* \* \*

UNITED STATES PATENT AND TRADEMARK OFFICE
CERTIFICATE OF CORRECTION

PATENT NO. : 7,585,179 B2  Page 1 of 1
APPLICATION NO. : 11/173467
DATED : September 8, 2009
INVENTOR(S) : Paul Charles Roberts It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 860 days.

Signed and Sealed this

Fourteenth Day of September, 2010

David J. Kappos
*Director of the United States Patent and Trademark Office*